United States Patent [19]

Tomek

[11] 3,947,424
[45] Mar. 30, 1976

[54] POLYAMIDATION PROCESS
[75] Inventor: Warren Lee Tomek, Richmond, Va.
[73] Assignee: E. I. Du Pont de Nemours and Company, Wilmington, Del.
[22] Filed: July 31, 1974
[21] Appl. No.: 493,395

[52] U.S. Cl. .................. 260/45.75 C; 260/45.7 R
[51] Int. Cl.² ............................................ C08G 6/00
[58] Field of Search ................. 260/45.75 C, 45.7 R

[56] References Cited
UNITED STATES PATENTS

| | | | |
|---|---|---|---|
| 2,705,227 | 3/1955 | Stamatoff .......................... | 260/45.7 |
| 2,960,489 | 11/1960 | Gabler ............................. | 260/45.75 |
| 3,377,314 | 4/1968 | Anton .............................. | 260/45.75 |
| 3,558,553 | 1/1971 | Hayes et al. ...................... | 260/45.75 |
| 3,573,245 | 3/1971 | Mueller et al. .................... | 260/45.75 |
| 3,634,319 | 1/1972 | Harrison et al. .................. | 260/45.75 |
| 3,709,710 | 1/1973 | Edgar et al. ...................... | 260/45.75 |
| 3,738,949 | 6/1973 | Schonberg et al. ............... | 260/45.75 |

FOREIGN PATENTS OR APPLICATIONS 908,647  10/1962  United Kingdom

*Primary Examiner*—V. P. Hoke

[57] ABSTRACT

In a process for the preparation of fiber-forming polyamides in the presence of a phenylphosphinate where copper from a cupric salt employed in the process tends to precipitate from the system, such copper loss is substantially reduced by using a mol ratio of KBr:KI of greater than 0.33 with 0.7 to 9 mols KI at a total potassium halide concentration of from 7.5 to 26 mols per million grams of polymer.

5 Claims, No Drawings

POLYAMIDATION PROCESS

BACKGROUND OF THE INVENTION

This invention concerns a process for the preparation of synthetic, linear, fiber-forming polyamides in the presence of a phenylphosphinate, a cupric salt and a specified ratio of KBr and KI.

The stabilization of polyamides against embrittlement by preparing them in the presence of certain phosphorous, copper and halogen compounds is disclosed in U.S. Pat. No. 2,705,227 to Stamatoff. However, under normal conditions, e.g., continuous polymerization including a flasher stage, this combination of additives results in the formation of metallic copper during the polymerization, resulting in processing difficulties and a reduced copper concentration in the final polymer.

An object of this invention is to reduce the amount of copper loss under such conditions, thus minimizing the problems associated therewith while otherwise retaining the beneficial properties of the resulting products and improving the process economics.

SUMMARY OF THE INVENTION

This invention is an improvement in the process for the preparation of a synthetic, linear, fiber-forming polyamide by the melt-polymerization of an aqueous, polyamide-forming solution of a salt of an aliphatic diamine and a dicarboxylic acid, which solution further contains a phenylphosphinate, cupric salt and an alkali metal halide. The function of the phenylphosphinate is that of a catalyst which accelerates the polymerization process. The cupric salt, after partial reduction, supplies cuprous ion to the polymer and serves as an antioxidant therein. The halide is usually added in chemical excess and is believed to form a complex with the cuprous ion, stabilizing the latter and inhibiting its reduction to metallic copper in the polymerization so that it will become incorporated into the polymer without loss.

According to the present invention, the polyamide-forming solution contains (1) a cupric salt in amounts sufficient to provide from 30 to 100 ppm. of copper by weight in the final polymer, (2) from 0.03 to 0.5% by weight of polymer of phenylphosphinic acid (present as a salt), and (3, 4) a specific ratio of potassium bromide:potassium iodide. As to the latter, there is an optimum combination of bromide and iodide which minimizes the amount of reduced copper dispersed in the polymerization vessel or filtered out in the spinning pack, vis. (3) from about 3.0, preferably 4.5, to about 17 mols potassium bromide per million grams of polymer and (4) from about 0.7 to about 9 mols potassium iodide per million grams of polymer, the potassium bromide and potassium iodide being present in a KBr:KI ratio of from about 0.33 to about 24, and at a total concentration of about 7.5 to about 26 mols total halide per million grams polymer, preferably from about 7.5 to about 21 mols total halide per million grams of polymer.

Usually, the polyamidation process is conducted in a continuous manner including a step with the reactants at polymerization temperature and under autogenous pressure being discharged through a flasher tube having successive lengths of increasing diameter wherein the reaction temperature is mtainained while the pressure is gradually reduced to substantially that of the atmosphere.

Preferably, the cupric salt is selected from the group consisting of cupric acetate and cupric nitrate.

Preferred salts of phenylphosphinic acid are the potassium salt and alkylene diammonium salts, e.g., hexamethylene diammonium phenylphosphinate. The salt may be added directly to the solution or generated in situ by addition of the acid to the alkylene diammonium-dicarboxylate, polyamide-forming salt solution.

In addition to the phosphinate, the solution can contain catalytic amounts of phenylphosphonic acid and salts thereof, particularly an alkylene diammonium salt.

EXAMPLE I

This example demonstrates the critical effect which the substitution of potassium bromide for potassium iodide has on the loss of copper during the continuous polymerization of a polyamide containing a cupric salt/alkali halide stabilizer in the presence of a phenylphosphinate employed as a catalyst.

A 51% by weight solution of hexamethylene diammonium adipate (6-6 nylon salt) in water in polymerized in a continuous polymerization system of the type described in U.S. Pat. No. 3,113,843 using an apparatus as schematically illustrated in FIGS. 1, 3 and 4 therein. The nylon salt solution also contains 0.19% (all percents based on weight of final polymer unless otherwise indicated) of potassium phenylphosphinate and 0.023% of cupric acetate monohydrate, calculated to provide about 73 ppm. copper on polymer weight. The reaction system consists sequentially of a reactor stage, a flasher stage, a steam/polymer separator stage and a vacuum finishing stage. The reaction conditions are regulated to provide a polymer of poly(hexamethylene adipamide) having a relative viscosity of 70 as measured in an 8.4% by weight solution of polymer in 90% by weight formic acid at 25°C. The resulting polymer is spun into filaments and drawn providing a high tenacity industrial yarn of 1260 denier, containing 210 filaments.

A series of polymerization runs are made under substantially identical conditions except for employing various combinations and concentrations of potassium iodide and potassium bromide in addition to the above-mentioned ingredients. The amount of copper lost in the polymerization system is determined by analysis of copper in the final yarn as compared to the amount introduced into the system. The results are shown in the following table.

The individual test items are run over periods of time from about 3 to 8 days each. For copper loss measurements, samples of feed nylon salt and spun yarn are taken about every 8 hours throughout the test period. In this manner, copper loss levels are developed by averaging from 7 to 24 independent determinations per item. The items are run consecutively and in random order to minimize effect of time trends in the polymerization process. Items A through J are run without interruption. Item K is added after interruption of one week. Statistical analysis of the copper loss data by Student's $t$-test at 95% level of confidence establishes that Items C, D, E and F are significantly lower in copper loss than Items A, B, G, H and J. Items D, E and F comprise a preferred range of KBr:KI ratios (greater than 1.2) and concentrations (at least 13.5 mols total halide).

TABLE

| Item | Mols Per 10⁶ gms Polymer | | | Mol Ratio KBr/KI | % KBr | % KI | Average Copper Loss, PPM* |
|------|------|------|------|------|------|------|------|
| | KBr | KI | KBr + KI | | | | |
| A | 0.0 | 13.9 | 13.9 | 0.0 | 0.0000 | 0.23 | 10.6 |
| B | 3.4 | 3.5 | 6.9 | 1.0 | 0.04 | 0.06 | 12.8 |
| C | 3.4 | 6.9 | 10.3 | 0.5 | 0.04 | 0.12 | 8.8 |
| D | 10.4 | 3.5 | 13.9 | 3.0 | 0.12 | 0.06 | 7.3 |
| E | 10.4 | 6.9 | 17.3 | 1.5 | 0.12 | 0.12 | 7.6 |
| F | 12.5 | 1.4 | 13.9 | 9.1 | 0.15 | 0.02 | 7.8 |
| G | 17.4 | 3.5 | 20.9 | 5.0 | 0.21 | 0.06 | 11.3 |
| H | 17.4 | 6.9 | 24.3 | 2.5 | 0.21 | 0.12 | 10.0 |
| J** | 13.9 | 0.0 | 13.9 | — | 0.17 | 0.00 | 29.0 |
| K | 7.0 | 6.9 | 13.9 | 1.0 | 0.08 | 0.12 | 11.1 |

*parts per million on polymer weight
**unacceptably short spin pack life from pluggage by particles of metallic copper From additional inspection of the data, it is seen that the loss of copper from polymer deposition in the polymerization system increases slightly versus that from the use of potassium iodide as the total halide content falls below 7.5 mols per million grams of polymer and increases drastically when potassium iodide is totally replaced by potassium bromide (Item J). The remaining items are at least equivalent and generally superior regarding copper loss versus potassium iodide alone (Item A), thus providing an economic advantage versus Item A from a reduced ingredients cost (potassium bromide is less expensive than potassium iodide) with no significant increase in copper loss and the problems and poorer economics associated therewith. For better economics, the mol ratio of KBr:KI should be greater than 0.33 at a total halide concentration of 7.5 to 26 mols per million grams of polymer; also, KI content should be from 0.7 to 9 mols per million grams of polymer, and KBr content should be from 3.0 to 17.0 mols per million grams of polymer (Items C, D, E, F and K). However, it is economically preferred that mol ratio of KBr:KI be greater than 1.2, total halide content be at least 13.5 but less than 21 mols per million grams of polymer and KBr content be at least 4.5 mols per million grams of polymer (Items D, E and F).

As shown in the table, copper loss was found to be a definite minimum when KBr was at intermediate levels. This was not at all expected. The lowest copper loss was expected at the maximum total halide content. It may be that the presence of phenylphosphinate catalyst in the process stream presents a hostile environment that tends to reduce copper to metallic form but that KBr and KI coordinate to form copper complexes resistant to this attack. In any event, the specified combination of KBr and KI provides improved economics and processing.

EXAMPLE II

This example confirms the improvement shown for Item D over Item A in Example I.

Items A and D are substantially repeated to produce Items L and M except that:

a. 0.15% phenylphosphinic acid is used instead of 0.19% potassium phenylphosphinate, and
b. polymer production rate is increased.

Copper loss is significantly reduced by the KBr/KI combination as demonstrated by the following data:

| Item | Mols per 10⁶ gms Polymer | | | Mol Ratio KBr/KI | % KBr | %KI | Copper Loss, PPM |
|------|------|------|------|------|------|------|------|
| | KBr | KI | KBr + KI | | | | |
| L | 0 | 13.5 | 13.5 | 0.0 | 0 | 0.22 | 6.3 |
| M | 10.0 | 3.4 | 13.4 | 3.0 | 0.12 | 0.06 | 2.8 |

Other embodiments and applications of the invention will occur to those skilled in the art without departing from the spirit of my invention which accordingly is intended to be limited only by the scope of the appended claims.

Having thus described the invention, what is claimed as new and desired to be secured by Letters Patent is:

1. In a process for the preparation of a synthetic linear fiber-forming polyamide by the melt-polymerization of an aqueous solution of a polyamide-forming salt of an aliphatic diamine and a dicarboxylic acid, the preliminary step of adding to said solution (1) a cupric salt sufficient to provide from 30 to 100 ppm. of copper by weight in the final polymer, (2) from 0.03 to 0.5%, by weight of polymer, of phenylphosphinic acid as a salt, (3) from about 3.5 to about 17 mols potassium bromide per million grams of polymer, and (4) from about 0.7 to 9 mols potassium iodide per million grams of polymer, components (3) and (4) being present in a KBr/KI mol ratio of greater than 0.33 and at a total concentration of 7.5 to 26 mols total halide per million grams of polymer to be produced.

2. The process of claim 1, wherein the cupric salt is cupric acetate.

3. The process of claim 1, wherein the salt of phenylphosphinic acid is selected from the group consisting of the potassium salt and an alkylene diammonium salt.

4. The process of claim 3, wherein said polyamide-forming salt is hexamethylene diammonium adipate and said KBr/KI mol ratio is greater than one.

5. The process of claim 1 wherein from 10.4–12.5 moles of KBr and 1.4–6.9 moles of KI are added to the solution at a mol ratio KBr/KI of 1.5–9.1.

* * * * *